United States Patent [19]

Fujii et al.

[11] Patent Number: 4,753,497
[45] Date of Patent: Jun. 28, 1988

[54] DIRECTIONAL COUPLER FOR COUPLING SINGLE-POLARIZATION OPTICAL FIBERS

[75] Inventors: Yoshimasa Fujii, Tokyo; Yoshinobu Mitsuhashi, Sakura; Hisato Uetsuka, Hitachi, all of Japan

[73] Assignees: Hitachi Cable Limited; The Agency of Industrial Science and Technology, both of Tokyo, Japan

[21] Appl. No.: 601,551

[22] Filed: Apr. 18, 1984

[30] Foreign Application Priority Data

Jun. 28, 1983 [JP] Japan .................................. 58-116512
Jun. 28, 1983 [JP] Japan .................................. 58-116513

[51] Int. Cl.$^4$ ................................................ G02B 6/26
[52] U.S. Cl. .............................. 350/96.15; 350/96.33; 350/320
[58] Field of Search .............. 350/96.15, 96.16, 96.20, 350/96.21, 96.29, 96.30, 96.33, 320

[56] References Cited

U.S. PATENT DOCUMENTS

| | | | |
|---|---|---|---|
| 4,386,822 | 6/1938 | Bergh | 350/96.15 |
| 4,426,129 | 1/1984 | Matsumura et al. | 350/96.33 |
| 4,493,528 | 1/1985 | Shaw et al. | 350/96.15 |
| 4,669,814 | 6/1987 | Dyott | 350/96.15 |

FOREIGN PATENT DOCUMENTS 52-24539  2/1977  Japan .................................. 350/96.15

OTHER PUBLICATIONS

Schöner et al., "Novel Method for Making Single-Mode Optical Fibre Directional Couplers," *Electronics Lett.*, vol. 18, No. 13, Jun. 1982, pp. 566-568.
Fourth International Conference on Integrated Optics and Optical Fiber Communication, Technical Digest, Jun. 27-30, 1983, Uetsuka et al.
(Japan) Electrical Society Meeting Data, "Sensor Device Using Single-Polarization Optical Fiber", May 26, 1983, pp. 31-39, Fujii et al.
(Japan) Applied Physics Society Meeting Data, "Directional Coupler for Coupling Single-Polarization Optical Fibers", Apr. 4-7, 1983, Uetsuka et al.

*Primary Examiner*—John Lee
*Attorney, Agent, or Firm*—Frishauf, Holtz, Goodman & Woodward

[57] ABSTRACT

A directional coupler for coupling two single-polarization optical fibers each comprising a core, a cladding, and an elliptic jacket having a major axis is made by preparing two quartz substrates each of which is formed with a channel on one major surface; embedding and bonding the jacketed single-polarization optical fibers in the channels in the substrates, respectively, such that the major axis of the elliptic jacket extends perpendicular to the substrate surface; abrading away the substrates together with the fiber embedded therein from the major surface to a depth where light traveling in the core of said fiber may leak out; placing one substrate on the other substrate with the abraded surfaces facing each other; and bonding the substrates to keep the cores in sufficiently close relation to establish evanescent wave coupling therebetween. A stress perpendicular to the major axis is preferably applied to the fiber.

22 Claims, 3 Drawing Sheets

DIRECTIONAL COUPLER FOR COUPLING SINGLE-POLARIZATION OPTICAL FIBERS

BACKGROUND OF THE INVENTION

This invention relates to a directional coupler for coupling together single-polarization or polarization-maintaining optical fibers, and more particularly, to such a directional coupler having an improved extinction ratio.

Single polarization fibers are useful in fiber optic rotation sensors, coherent communication systems, etc., because such fibers can transmit information on both phase and the state of polarization. Directional couplers, polarization controllers and polarizers have been developed for such fiber optic systems.

It is an object of the present invention to provide an improved directional coupler for coupling single-polarization optical fibers which is significantly improved in polarization maintenance or extinction ratio.

SUMMARY OF THE INVENTION

According to a first aspect of the present invention, there is provided a directional coupler for coupling together two single-polarization optical fibers each comprising a core, a cladding enclosing the core, and an elliptic jacket enclosing the cladding and having a major axis and a minor axis perpendicular thereto, said coupler being prepared by the steps of preparing first and second quartz substrates each of which is formed on one major surface with a channel having a size equal to or slightly wider than the outer diameter of the fiber, embedding and bonding the jacketed single-polarization optical fibers in the channels in the first and second substrates, respectively, such that the major axis of the elliptic jacket of the fiber extends approximately perpendicular to the surface of the substrate, abrading away each of the first and second substrates together with the fiber embedded therein from the major surface to a depth where light traveling in the core of said fiber may leak out, placing the first substrate on the second substrate with the abraded surfaces of the first and second substrates facing each other, and bonding the first and second substrates to keep the cores in sufficiently close relation to establish evanescent wave coupling therebetween.

According to the present invention, the above-mentioned directional coupler further comprises fastening means for externally applying a stress to the fiber in a direction perpendicular to the major axis of the elliptic jacket.

DESCRIPTION OF THE PREFERRED EMBODIMENTS

Figure 1:
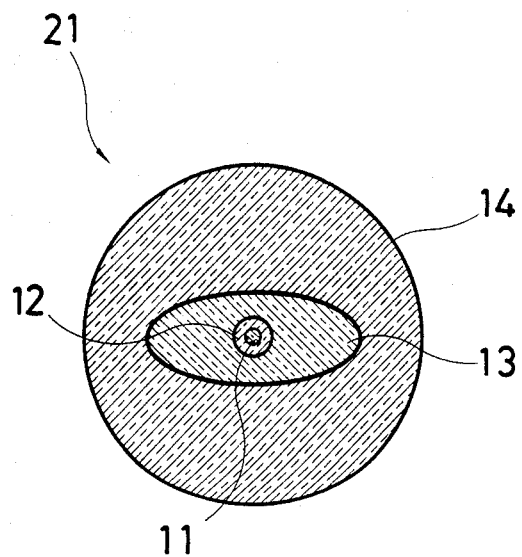
FIG. 1 is a cross-sectional view of typical single-polarization fiber (SPF)

FIG. 1 is a cross-sectional view of a typical elliptic jacket type single-polarization fiber (SPF) 21. The SPF comprises a core 11, a cladding 12 enclosing the core, and an elliptic jacket 13 enclosing the cladding and having a major axis and a minor axis perpendicular thereto. The jacket 13 is covered with a support 14. An SPF of such a structure is well known in the art. The SPF is designed such that a stress is applied to the core 11 due to the difference in thermal expansion between the elliptic jacket 13 and the support 14 at room temperature. With such a design, the photoelastic effect gives rise to mode double refraction between x and y directions of the core, minimizing the mode coupling between, $HE_{11x}$ and $HE_{11y}$ of incident light to the SPF.

The inventors first made a directional coupler as follows.

Figure 2:
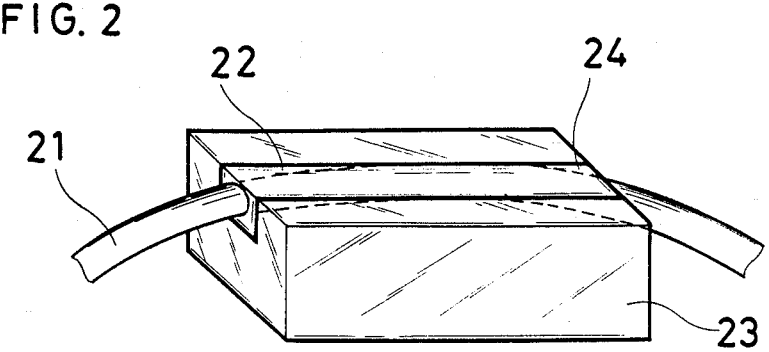
FIG. 2 is a perspective view of a quartz substrate in which an SPF is embedded with a bonding agent.
Figure 3:
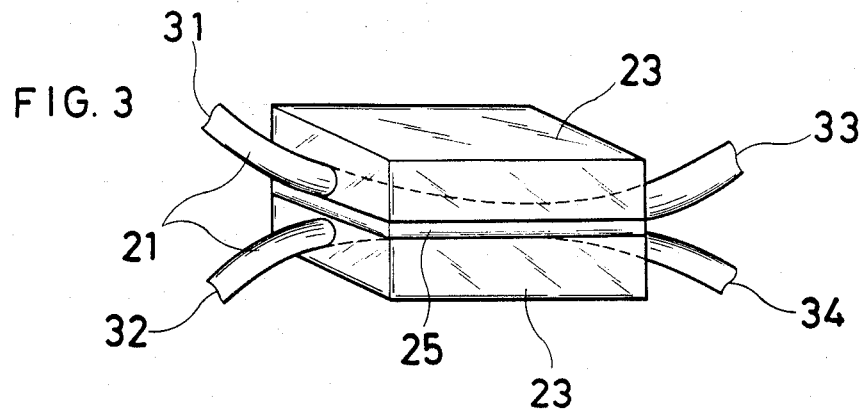
FIG. 3 is a perspective view of a directional coupler for coupling two SPF's.
Figure 4:
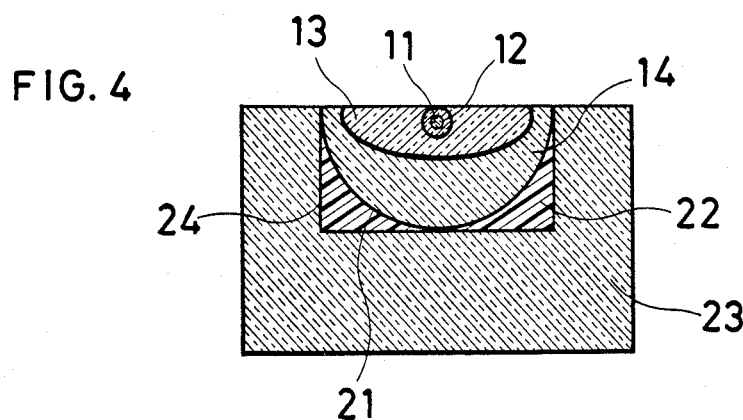
FIG. 4 is a cross sectional view of the quartz substrate having an SPF embedded therein as shown in FIG. 2, but the surface being abraded away while the major axis of the elliptic jacket of the SPF extends parallel to the substrate surface.

A directional coupler for coupling single-polarization fibers is described in conjunction with FIGS. 2 to 4. A rectangular substrate 23 of fused silica or quartz is formed in one major surface with a channel 22 having a size equal to or wider by up to 30 $\mu$m than the outer diameter of SPF 21 which is typically 125 $\mu$m. The SPF 21 is extended throughout the channel 22 in the substrate 23 and embedded therein with a cement or resin 24 for example epoxy glue. The substrate 23 along with the SPF 21 embedded therein is then abraded away to a depth where light traveling in the core may escape from or leak out of the fiber, as shown in FIG. 4. The fully abraded substrate having the SPF exposed is combined with a similarly abraded substrate having the SPF exposed while their abraded surfaces face each other with an index matching fluid 25 interposed therebetween. The substrates are bonded to keep the cores in sufficiently close relation to ensure evanescent wave coupling therebetween. There is thus formed a directional coupler which couples the single polarization fibers 21 to each other.

It is to be noted that the channel 22 in the substrate has a curved bottom and is deeper at its longitudinal ends than at the center, and the fiber in the channel is thus abraded or polished only at its central portion.

If the SPF 21 is embedded in the quartz substrate 23 such that the major axis of the elliptic jacket 13 of the SPF extends parallel to the surface of the substrate as shown in FIG. 4, then the stress applied to the core 11 of the SPF 21 is appreciably released, and the core 11 becomes susceptible to perturbation due to strain caused by abrading, stresses caused by differential thermal expansion between the cement 24 and the quartz substrate 23 or SPF 21, and other factors, detracting from polarization maintenance.

The present inventors have found that these drawbacks can be eliminated by extending the major axis of the elliptic jacket of the fiber perpendicular to the surface of the substrate when the fiber is embedded in the channel in the substrate.

One preferred embodiment of the directional coupler of the present invention will be described in conjunction with FIG. 5.

Figure 5:
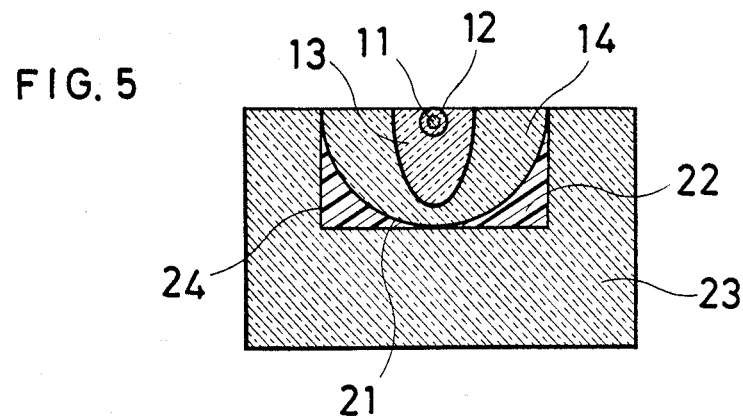
FIG. 5 is a cross sectional view of the SPF embedded quartz substrate similar to FIG. 4, but with the major axis of the elliptic jacket of the SPF extending perpendicular to the substrate surface according to the present invention.

FIG. 5 is a cross section similar to FIG. 4 and illustrating a lower half of the directional coupler for coupling two single-polarization fibers (SPF) according to the present invention, that is, a quartz substrate having an SPF embedded therein and the surface abraded away. More particularly, a quartz substrate 23 has a channel 22 formed on one major surface, channel 22 having a size equal to or wider by up to 30 $\mu$m than the outer diameter of an SPF 21. The SPF 21 is embedded in the channel 22 in the substrate 23 with a resinous cement 24 such that the major axis of the elliptic jacket 13 of the SPF 21 extends perpendicular to the surface of the substrate within an error of $\pm 20°$, and most preferably $\pm 5°$. The quartz substrate 23 is then abraded away from the major surface along with the SPF 21 embedded therein to a depth where light traveling in the core 11 of the SPF 21 may leak out of the fiber.

Another quartz substrate having an SPF embedded therein is made up by the same procedure. Two such SPF-embedded substrates are then placed one on another and bonded together while their abraded surfaces face each other with an index matching fluid 25 interposed therebetween as shown in FIG. 3.

A directional coupler having the overall structure shown in FIG. 3 and the fiber orientation as shown in FIG. 5 was operated in 1:1 branching. When linearly polarized light was incident on one port 31 of one SPF 21 along its central axis, it appeared at the other port 33 of the same SPF with an extinction ratio of $-30$ dB or lower and at the other port 34 of the other SPF with an extinction ratio of $-32$ dB or lower. This data proves that polarization maintenance, that is, extinction ratio is significantly improved.

Because of the residual strain in the substrate caused by abrading, the distribution of stress in the SPF might be somewhat changed, detracting from polarization maintenance.

To overcome the problem of stress change, it is preferable to provide means for preventing the stress to the core from being released.

Another preferred embodiment of the directional coupler according to the present invention will be described in conjunction with FIGS. 6 and 7.

Figure 6:
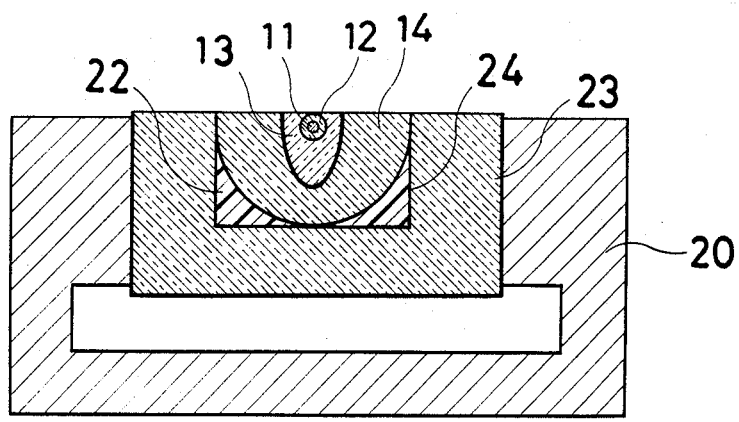
FIG. 6 is a cross sectional view, similar to FIG. 5, of the SPF embedded quartz substrate having a clamp mounted according to one preferred embodiment of the present invention.

FIG. 6 is a cross section, similar to FIG. 5, illustrating a lower half of the directional coupler for coupling two single polarization fibers (SPF) according to the present invention, that is, a quartz substrate having an SPF embedded therein and the surface abraded away. Those elements having the same reference numbers as in FIGS. 4 and 5 are the same as in the previous embodiment and will be understood without further explanation. In FIG. 6, the SPF 21 is embedded in the channel 22 in the quartz substrate 23 such that the major axis of the elliptic jacket 13 of the SPF is approximately perpendicular to the substrate major surface. The substrate 23 is abraded away along with the SPF embedded therein by the same procedure as above. In this embodiment, the substrate 23 is pressed by mechanical fastening means in the form of a pressure clamp 20 to apply a pressure of 1 to 1,000 kg-weight/cm$^2$, usually 2 kg-weight/cm$^2$ to the SPF 21 from the opposed sides of the substrate in a direction perpendicular to the major axis of the elliptic jacket 13. For the purpose of preventing the stress to the core from being released, any of well-known fastening means may be employed instead, for example, screw clamps and leaf spring clamps.

Figure 7:
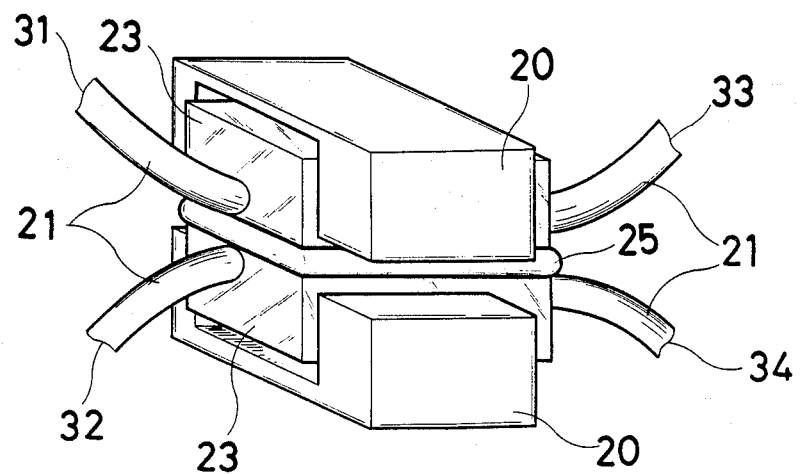
FIG. 7 is a perspective view of the directional coupler according to the preferred embodiment of the present invention.

A directional coupler manufactured by assembling two such SPF-embedded substrates is shown in the perspective view of FIG. 7. More particularly, two quartz substrates 23 having the construction as shown in FIG. 6 are placed one on another while their abraded surfaces face each other with an index matching fluid 25 interposed therebetween. The quartz substrates 23 are bonded together to keep the cores in sufficiently close relation to establish evanescent wave coupling therebetween, obtaining a directional coupler for coupling single-polarization fibers with 1:1 branching.

In the coupler of the above embodiment, when linearly polarized light was incident on one port 31 of one SPF 21 along its central axis, the extinction ratio at the other port 33 of the same SPF was $-30$ dB or lower and the extinction ratio at the other port 34 of the other SPF was $-30$ dB or lower. This data proves that polarization maintenance or extinction ratio is significantly improved.

The directional coupler of the invention is useful in fiber interferometers and coherent communications. Prior art all single-polarization optical fiber ring interferometers require the use of a polarizer and a polarization controller in order to obtain stable performance with high sensitivity and minimal noise. Such interferometers are seriously affected by non-reciprocity factors except angular velocity of rotation, that is, non-reciprocity factors caused by a phase modulator and ambient atmospheric changes. The use of the directional SPF coupler of the present invention allows for the manufacture of an all SPF ring interferometer which is simple in entire construction and less susceptible to non-reciprocity factors except angular velocity of rotation.

The present invention is described with reference to the preferred embodiments although many modifications and variations may be made within the scope of the invention.

What we claim is:

1. A directional coupler for coupling together two single-polarization optical fibers each comprising a core, a cladding enclosing the core, an elliptic jacket enclosing the cladding to form a jacketed single-polarization optical fiber, the elliptic jacket having a major axis and a minor axis perpendicular to said major axis, and a support surrounding the elliptic jacket for applying a stress to the core due to a difference in thermal expansion between the jacket and the support; said coupler being prepared by the steps of:

preparing first and second quartz substrates each of which has a channel on one major surface thereof, each channel having a size equal to or slightly wider than the outer diameter of the support surrounding the jacketed optical fiber;

embedding and bonding the jacketed optical fibers with associated supports in the channels in the first and second substrates, respectively, such that the major axis of the elliptic jacket of each of the jacketed optical fibers extends approximately perpendicular to the major surface of the respective substrate;

abrading away each of the first and second substrates together with the jacketed optical fiber embedded therein from the major surfaces of the substrates to a depth where light traveling in the core of the respective optical fiber may leak out;

placing one of the first and second substrates on the other of the first and second substrates with the abraded surfaces of the first and second substrates facing each other;

bonding the first and second substrates together in said facing relationship to keep the cores of said optical fibers in sufficiently close relation to establish evanescent wave coupling therebetween; and preventing stresses existing in each core prior to said abrading step from being released by;

applying a stress to each jacketed optical fiber through its associated support by arranging stress applying means externally of said optical fibers, and applying said stress in a direction approximately perpendicular to the major axis of the elliptic jacket of the respective optical fiber.

2. The directional coupler according to claim 1 wherein the major axis of the elliptic jacket of each optical fiber extends perpendicular to the major surface of its respective substrate within an error of ±20°.

3. The directional coupler according to claim 1 wherein the major axis of the elliptic jacket of each optical fiber extends perpendicular to the major surface of its respective substrate within an error of ±5°.

4. The directional coupler according to claim 1, comprising interposing an index matching fluid between the abraded surfaces of the first and second substrates when placing one of the substrates on the other of the substrates with said abraded surfaces facing each other.

5. The directional coupler according to claim 1, wherein said jacketed optical fibers are embedded and bonded in the channels of their respective substrates by means of a resinous cement.

6. The directional coupler of claim 1, wherein said step of applying said stress comprises applying said stress in the vicinity of the abraded portions of the fibers.

7. The directional coupler of claim 6, wherein said substrates have opposed sides which extend substantially parallel with said major axis of the elliptic jacket of the respective optical fibers, and said stress is applied to said opposed sides.

8. The directional coupler of claim 1, wherein said substrates have opposed sides which extend substantially parallel with said major axis of the elliptic jacket of the respective optical fibers, and said stress is applied to said opposed sides.

9. The directional coupler according to claim 1 wherein said substrates each have opposed surfaces, and said step of applying said stress comprises clamping the respective substrates at said opposed surfaces thereof to apply said stress to the respective optical fiber embedded therein.

10. The directional coupler according to claim 1 wherein a stress of 1 to 1,000 kg-weight/cm² is externally applied to each optical fiber.

11. The directional coupler according to claim 10, wherein said stress is 2 kg-weight/cm².

12. A method of making a directional coupler for coupling two single-polarization optical fibers each comprising a core, a cladding enclosing the core, an elliptic jacket enclosing the cladding to form a jacketed single-polarization optical fiber, the elliptic jacket having a major axis and a minor axis perpendicular to said major axis, and a support surrounding the elliptic jacket for applying stress to the core due to a difference in thermal expansion between the jacket and the support; the method comprising the steps of:

preparing first and second quartz substrates each of which has a channel on one major surface thereof, each channel having a size equal to or slightly wider than the outer diameter of the support surrounding the jacketed optical fiber;

embedding and bonding the jacketed optical fibers with associated supports in the channels in the first and second substrates, respectively, such that the major axis of the elliptic jacket of each of the jacketed optical fibers extends approximately perpendicular to the major surface of the respective substrate;

abrading away each of the first and second substrates together with the jacketed optical fiber embedded therein from the major surfaces of the substrates to a depth where light traveling in the core of the respective optical fiber may leak out;

placing one of the first and second substrates on the other of the first and second substrates with the abraded surfaces of the first and second substrates facing each other;

bonding the first and second substrates together in said facing relatinship to keep the cores of said optical fibers in sufficiently close relation to establish evanescent wave coupling therebetween; and preventing stresses existing in each core prior to said abrading step from being released by;

externally applying a stress to each fiber in a direction approximately perpendicular to the major axis of the elliptic jacket of the respective optical fiber.

13. The method of claim 12, comprising embedding said jacketed optical fibers in said respective substrates such that the major axis of the elliptic jacket of each optical fiber extends perpendicular to the major surface of its respective substrate within an error of ±20°.

14. The method of claim 12, comprising embedding said jacketed optical fibers in said respective substrates such that the major axis of the elliptic jacket of each optical fiber extends perpendicular to the major surface of its respective substrate within an error of ±5°.

15. The method of claim 12, wherein said step of externally applying said stress comprises clamping the respective substrates at opposed surfaces of said respective substrates to apply said stress to the respective optical fiber embedded therein.

16. The method of claim 12, wherein a stress of 1 to 1,000 kg-weight/cm² is externally applied to each optical fiber.

17. The method of claim 12, comprising interposing an index matching fluid between the abraded surfaces of the first and second substrates when placing one of the substrates on the other of the substrates with said abraded surfaces facing each other.

18. The method of claim 12, wherein a stress of 2 kg-weight/cm² is externally applied to each optical fiber.

19. The method of claim 12, wherein said jacketed optical fibers are embedded and bonded in the channels of their respective substrates by means of a resinous cement.

20. The method of claim 12, wherein said step of externally applying said stress comprises applying said stress in the vicinity of the abraded portions of the fibers.

21. The method of claim 20, wherein said substrates have opposed sides which extend substantially parallel with said major axis of the elliptic jacket of the respective optical fibers.

22. The method of claim 12, wherein said substrates have opposed sides which extend substantially parallel with said major axis of the elliptic jacket of the respective optical fibers, and said stress is applied to said opposed sides.

* * * * *